US009438367B2

(12) United States Patent
Wei et al.

(10) Patent No.: US 9,438,367 B2
(45) Date of Patent: Sep. 6, 2016

(54) METHOD AND SYSTEM FOR PROVIDING AN EXTERNAL OPTICAL DATA PACKET TO A DESTINATION NODE OF A PACKET OPTICAL NETWORK

(71) Applicant: NTT DOCOMO, Inc., Chiyoda-ku, Tokyo (JP)

(72) Inventors: Qing Wei, Munich (DE); Kazuyuki Kozu, Munich (DE)

(73) Assignee: NTT DOCOMO, INC., Tokyo (JP)

(*) Notice: Subject to any disclaimer, the term of this patent is extended or adjusted under 35 U.S.C. 154(b) by 385 days.

(21) Appl. No.: 14/041,760

(22) Filed: Sep. 30, 2013

(65) Prior Publication Data
US 2014/0093241 A1 Apr. 3, 2014

(30) Foreign Application Priority Data

Oct. 1, 2012 (EP) .................................... 12186801

(51) Int. Cl.
*H04J 14/00* (2006.01)
*H04J 14/02* (2006.01)
*H04Q 11/00* (2006.01)

(52) U.S. Cl.
CPC ........ *H04J 14/0201* (2013.01); *H04J 14/0257* (2013.01); *H04J 14/0267* (2013.01);
(Continued)

(58) Field of Classification Search
CPC .. H04J 14/0201; H04J 14/0212; H04J 14/02; H04J 14/0267; H04B 10/275; H04B 10/2755; H04B 10/2575; H04Q 11/0005; H04Q 11/0066
USPC ........ 398/45, 46, 48, 49, 50, 51, 54, 56, 67, 398/58, 59, 79, 83, 33, 115, 66, 68, 72; 370/352, 392, 389, 401, 468
See application file for complete search history.

(56) References Cited

U.S. PATENT DOCUMENTS 6,952,533 B2 * 10/2005 Kim .................... H04Q 11/0066
398/166
7,200,331 B2 * 4/2007 Roorda ............... H04J 14/0206
398/58

(Continued)

FOREIGN PATENT DOCUMENTS

CN       1601995 A      3/2005
JP    2003-179560 A     6/2003

(Continued)

OTHER PUBLICATIONS

Chiaroni, Dominique et al., "Packet OADMs for the Next Generation of Ring Networks," © 2010 Alcatel-Lucent, Bell Labs Technical Journal, vol. 14(4), 2010, pp. 265-284.

(Continued)

*Primary Examiner* — Hanh Phan
(74) *Attorney, Agent, or Firm* — Brinks Gilson & Lione

(57) ABSTRACT

A method and a system for providing an external optical data packet to a destination node of a packet optical network are described. The packet optical network includes a plurality of nodes and a first optical data channel for optically communicating local optical data packets between the plurality of nodes. The external optical data packet is optically converted for a transmission to the destination node over a second optical data channel of the packet optical network, the first and second optical data channels being independent of each other, the converted external optical data packet is optically transferred to the packet optical network, and the converted external optical data packet is transmitted to the destination node over the second optical data channel.

17 Claims, 9 Drawing Sheets

(52) U.S. Cl.
CPC ....... *H04J14/0269* (2013.01); *H04Q 11/0066* (2013.01); *H04J 14/0258* (2013.01); *H04J 14/0283* (2013.01); *H04J 14/0284* (2013.01); *H04J 14/0286* (2013.01); *H04Q 2011/0077* (2013.01)

(56) References Cited

U.S. PATENT DOCUMENTS

| | | | |
|---|---|---|---|
| 7,421,203 B2* | 9/2008 | Kim | H04L 12/4633 370/218 |
| 2004/0208540 A1 | 10/2004 | Nakajima et al. | |
| 2008/0019696 A1 | 1/2008 | Choi et al. | |
| 2011/0091212 A1* | 4/2011 | Nonaka | H04J 14/0286 398/66 |

FOREIGN PATENT DOCUMENTS

| | | |
|---|---|---|
| JP | 2007-20017 A | 1/2007 |
| JP | 2007-535269 A | 11/2007 |

OTHER PUBLICATIONS

Lee, Kuo-Chun et al., "Multi-Wavelength All-Optical Networks with Wavelengths Outside the Erbium-Doped Fiber Amplifier Bandwidth," © 1995 IEEE, Journal of Lightwave Technology, vol. 15, No. 5, May 1995, pp. 791-800.

Papadimitriou, Georgios I. et al., "Optical Switching: Switch Fabrics, Techniques, and Architectures," © 2003 IEEE, Journal of Lightwave Technology, vol. 21, No. 2, Feb. 2003, pp. 384-405.

Office Action and English language translation thereof, in corresponding Chinese Application No. 201310460703.8, dated Apr. 25, 2016, 14 pages.

* cited by examiner

- PRIOR ART -

METHOD AND SYSTEM FOR PROVIDING AN EXTERNAL OPTICAL DATA PACKET TO A DESTINATION NODE OF A PACKET OPTICAL NETWORK

RELATED APPLICATIONS

This application claims priority under 35 U.S.C. §119 to European Patent Application No. 12186801.2 filed on Oct. 1, 2012, the entire content of which is hereby incorporated by reference.

BACKGROUND OF THE INVENTION

Embodiments of the invention relate to approaches for allowing an optical packet to be optically provided to a packet optical network, e.g. for allowing an optical communication between two or more packet optical networks enabling an optical bypass between two or more packet optical networks, for example packet optical mobile communication networks.

FIGS. 1A through 1C show examples for optical networks communicating with each other. FIG. 1A is a general representation of two packet optical networks exchanging signals/messages. FIG. 1B is a more detailed representation of the networks being a mobile core network and a mobile metro/access network. FIG. 1C is an even more detailed representation of possible implementations of the mobile networks from FIG. 1B.

As is shown in FIG. 1A, a first packet optical network 100 and a second packet optical network 102 are shown schematically. Within each of the networks 100, 102 local traffic occurs, as is represented by the arrows 104 and 106, which is only within the respective network 100 and 102. In addition, it may be desired to exchange information between the networks 100 and 102 which is referred to as cross traffic 108. The networks 100 and 102 are optical networks and the local traffic 104, 106 is done on the basis of optical signals. When communicating between the networks 100 and 102, the cross traffic 108 needs to transfer signals or messages among the two networks 100 and 102.

FIG. 1B shows an example for the configuration shown in FIG. 1A in which the network 100 is a mobile core network of a mobile communication system, including a plurality of nodes, for example a packet data network gateway 110 (P-GW), a service gateway 112 (S-GW) and a mobile management entity 114 (MME), which are shown only schematically as respective nodes in the mobile core network 100. The second packet optical network 102, in FIG. 1B is a mobile metro/access network 102 including a plurality of mobile access areas represented schematically by base stations 116a to 116c. Each of the access areas serves a plurality of mobile users, and the base stations communicate with each other on the basis of the X2 protocol, thereby generating the X2 traffic 106. The mobile metro/access network 102 and the mobile core network 100 need to communicate with each other, for example there needs to be a communication among the respective base stations 116a to 116c of the mobile metro/access network 102 with the serving gateway 112 (see S1 traffic 108).

FIG. 1C shows a further detailed representation of FIG. 1B, especially more details regarding the mobile core network 100 and the mobile metro/access network 102. The mobile core network 100 may include an HOPR mesh (HOPR=Hybrid Optoelectronic Router), and the mobile metro/access network 102 may include a plurality of POADM rings (POADM=Packet Optical Add/Drop Multiplex). The network 100 comprises the nodes 110 to 114 described with regard to FIG. 1B, each node including the resources 110a, 112a, 114a necessitated, for example CPUs, memory elements, and the like. Further, each of the nodes includes an optoelectronic router 110b, 112b and 114b for exchanging optical signals among the respective nodes and for converting the optical signals into electric signals for handling by the respective resources. The network 100 in FIG. 1C shows additional optoelectronic routers 118 and 120 for providing alternative connections between nodes 110, 112 and between nodes 112 and 114 or for providing additional access points for the network 100.

The mobile metro/access network 102 comprises several POADM rings, e.g., 122a to 122c. The first POADM ring includes three base stations 124a to 124c communicating among each other, thereby generating local traffic 106a, for example using the X2 protocol. The local traffic 106a is based on optical signals. The POADM ring 122b includes four base stations 126a to 126d communicating with each other in accordance with the X2 protocol, thereby generating local traffic 106b. Likewise, POADM ring 122c includes four base stations 128a to 128d communicating with each other in accordance with the X2 protocol, thereby generating the local traffic 106c. Communication among the base stations in the rings 122b and 122c, like in ring 122a, is based on optical signals exchanged among the respective base stations. Within each ring, one of the base stations, e.g. base stations 124a, 126a and 128a, is defined as the hub node for interfacing with the mobile core network for coupling the respective rings to the core network entities. The base station 124a of the first ring 122a is connected to the service gateway node 112, as is the first base station 126a of the second ring 122b. Via this interface, cross traffic 108a and 108b between the service gateway 112 and the first ring 122a and the second ring 122b, respectively, occurs. The third ring 122c is coupled via the further access node 118 of the core network 100 to the respective gateways described and respective cross traffic 108c is generated between the mobile core network and the third ring 122c. The cross traffic 108a to 108c may include S1 traffic.

In the above described optical networks 100, 102, optical routers/switches are used which are advantageous due to the low energy consumption and high capacity when compared to electrical routers/switches. FIG. 2 shows a comparison of the energy consumption at electrical switches/routers and optical switches/routers. As can be seen, the routers and Ethernet switches (see the upper two rows of FIG. 2) have the highest energy consumption which constantly drops when implementing the switches with optical components obtaining the lowest energy consumption when using an all optical switch (OOO switch: Optical-Optical-Optical switch). With the growth of data traffic in networks, for example the increase of mobile data traffic due to the rapid spread of smart phones and the commercialization of LTE services, there is a need to change the network transport technology from electrical packet switching to optical packet switching also between the core network and the metro/access network. Because of the different requirements in the different parts of an overall network different optical switching techniques may be used within the respective networks (for example the above core network 100 and the metro/access network 102). These networks may have different requirements regarding costs, network resilience, data rate, data aggregation, etc., different optical switching techniques may be used within the respective networks.

Thus, while there is already a solution for optical communication within the respective networks, there is currently no solution to efficiently interconnect different packet optical networks. Rather, at present the interconnection of different packet optical networks is done electrically, i.e. the above described cross traffic 108, 108a to 108c is done electrically. The cross traffic between the different packet optical networks is converted into the electrical domain, is electrically processed, for example in the IP/Ethernet layer, is electrically stored, for example in the electric buffer and is then converted back into the optical domain such that it can be understood by the target packet optical network. This OEO conversion (OEO=Optical-Electrical-Optical) and electrical processing necessitates a lot of time and leads to a high energy consumption. Further, such interconnection points also form a bottleneck with regard to the traffic transport between the different packet optical networks.

A similar problem occurs when considering only a single optical network which needs to receive external data packets which can be generated by the external packet provider in the optical domain. In such a situation, like above, it is necessitated to provide for the conversion of the external optical data packet into the electrical domain, to electrically process it and to convert it back into the optical domain of the network which needs to receive the external data packet, which again leads to the above mentioned problems regarding the OEO conversion and the electrical processing.

SUMMARY OF THE INVENTION

According to an embodiment, a method for providing an external optical data packet to a destination node of a packet optical network, the packet optical network having a plurality of nodes and a first optical data channel for optically communicating local optical data packets between the plurality of nodes may have the steps of: optically converting the external optical data packet for a transmission to the destination node over a second optical data channel of the packet optical network, the first and second optical data channels being independent of each other; optically transferring the converted external optical data packet to the packet optical network; and transmitting the converted external optical data packet to the destination node over the second optical data channel, wherein the external optical data packet includes a header and a payload section, and wherein the header includes control information and the payload section includes data payload.

Another embodiment may have a computer program product having instructions stored on a computer readable medium, said instructions carrying out the method mentioned above when being executed on a computer.

According to another embodiment, a system for providing an external optical data package to a destination node may have: a packet optical network having a plurality of nodes, a first optical data channel for optically communicating local optical data packets between the plurality of nodes, and a second optical data channel for optically communicating external optical data packets between the plurality of nodes, wherein the first and second data channels are independent of each other, and wherein the plurality of nodes have the destination node; and an external node optically connected to the packet optical network, the external node being configured to receive the external optical data packet, to optically convert the received external optical data packet for a transmission to the destination node over the second optical data channel of the packet optical network, and to optically transfer the converted external optical data packet to the packet optical network, wherein the external optical data packet includes a header and a payload section, and wherein the header includes control information and the payload section includes data payload.

In accordance with embodiments, the first and second optical data channels have allocated different wavelengths, and optically converting the external optical data packet comprises a wavelength conversion for obtaining the converted external optical data packet at a wavelength allocated to the destination node for transmission over the second optical data channel. The wavelength conversion may be based on a table mapping destination addresses for the nodes of the packet optical network to wavelengths allocated to the nodes of the packet optical network for transmission over the second optical data channel. The wavelength used for transmission over the first and second optical data channels may be allocated dynamically or in advance.

In accordance with embodiments the method further comprises, upon receipt of the external optical data packet, sending a notification to the packet optical network, the notification including address information about the destination node. The packet optical network may further comprise a control channel for communicating control channel information between the plurality of nodes, and the method may further comprise preparing a control header for the external optical packet on the basis of the received notification, and transmitting the control header over the control channel upon transmitting the converted external optical packet over the second data channel. The notification may comprise further information about the external optical data packet, like the QoS of the packet, the control header being further prepared on the basis of the further information.

In accordance with embodiments, the packet optical network is a slotted packet optical network, and the method comprises optically delaying the converted external optical data packet so that the converted external optical data packet is transmitted in the next time slot, the delay being less than or equal to the duration of a single time slot in the slotted packet optical network.

In accordance with embodiments the external optical data packet is received at an the external node optically coupled to the packet optical network, wherein the external data packet is optically converted at the external node. The external node may be a node of a further packet optical network including a plurality of nodes communicating over a further optical data channel. The packet optical network may comprise a mobile access network operating in accordance with a first technology and the further packet optical network may comprise a mobile core network operating in accordance with a second technology being different from the first technology, and the local optical data packets may comprise packets transmitted between base stations of the mobile access network and the external optical data packets comprise packets transmitted between gateways of the mobile core network and the base stations of the mobile access network.

In accordance with embodiments, the packet optical network comprises an optical fiber, and wherein the optical packets for the first and second data channels are transmitted in the same optical fiber.

Thus, in accordance with embodiments of the invention, an advantageous way for allowing the transmission of optical packets to an packet optical network is provided which avoids the above mentioned problems with known approaches, especially problems regarding long latencies, delays and high energy consumption, which are due to the necessity of the conventional approaches to provide for a conversion of the optical signal into the electrical domain, mainly for buffering and processing, before it is sent to the receiving optical network operating in the optical domain, thereby necessitating a reconversion from the electrical domain into the optical domain. The optical packets may come from an external source, like a data processing unit generating the data packets in an optical format which need to be provided to the optical network in a way that they can be handled by the optical network, or alternatively the optical packet may stem from another packet optical network and need to be transferred for a communication with the target packet optical network thereto in a format that they can be understood by the receiving optical network.

In accordance with embodiments of the invention, the problems associated with known approaches are avoided by providing the external optical packet to a packet optical network which has a first optical data channel for transmitting local traffic and in addition a second optical data channel for transmitting the external packets. To allow transmission of the external packet to the desired node a conversion of the external packet is needed only in the optical domain, for example by modifying the wavelength in such a way that the wavelength of the optical signals used in the external packet corresponds to a wavelength allocated to a destination node for transmissions over the second optical data channels.

Embodiments of the invention further provide a method for passing a packet optically between different packet optical networks, thereby providing for a "optical bypass". In accordance with embodiments, a dedicated data channel for the cross traffic and a dedicated data channel for the local traffic is provided, thereby allowing an improved interconnection of the different data optical networks.

The inventive approach is advantageous as it allows to reduce the energy consumption and the latency for packet switching between different packet optical networks without affecting the local traffic. For example, experiments have shown that the energy consumption can be decreased by as much as 90%, and the latency can be decreased by as much as 99%. As a consequence, less operational expenditure (OPEX) and less capital expenditure (CAPEX) can be expected. For example, in the field of mobile networks, full advantage of fast and energy efficient optical transports is taken, which leads to the above mentioned low OPEX by a more efficient transport due to less OEO conversion and the reduced number of electrical processes, and also to the above mentioned low CAPEX as less electrical buffers and reduced cooling system requirements are needed, and also a higher network capacity, bandwidth, is provided. Further, due to the low transport delay, a high customer satisfaction can be expected and by means of the lower energy consumption $CO_2$ emission will be reduced.

Thus, in accordance with embodiments an apparatus and a method are provided to realize an optical connection between different packet optical transport networks, and in accordance with this embodiment the data traffic is separated into cross traffic and local traffic, both types of traffic being transported in separate data channels. The corresponding procedure for packet switching between the different packet optical networks includes a novel approach for exchanging control information, for converting the control information, for a time synchronization and for the resource allocation necessitated.

BRIEF DESCRIPTION OF THE DRAWINGS

Embodiments of the invention will be described in further detail on the basis of the accompanying drawings, in which:

FIGS. 1A through 1C show examples for optical networks communicating with each other, wherein FIG. 1A is a general representation of two packet optical networks exchanging signals/messages, wherein FIG. 1B is a more detailed representation of the networks being a mobile core network and a mobile metro/access network, and wherein FIG. 1C is an even more detailed representation of possible implementations of the mobile networks from FIG. 1(b);

DETAILED DESCRIPTION OF THE PREFERRED EMBODIMENTS

In the following, embodiments of the present invention for implementing an optical bypass for passing an optical packet optically from an external node, for example a node of a first optical network, to a receiving packet optical network will be described. So far, conventional approaches necessitate the conversion of the optical packet into the electrical domain, processing it and converting it back to the optical domain. To avoid such problems, in accordance with this invention, an optical bypass is provided as mentioned above, however, there are several challenges to realizing such a bypass:

1. Conversion in the control plane: the two interconnected packet optical networks may have different control mechanisms, for example there may be different addressing schemes, different ways of treating QoS, etc. Further, one of the packet optical networks may have an in-band control channel, while the other one may have a dedicated control channel.

2. Conversion in the user plane: the data transport system of the interconnected packet optical networks is independent from each other, so that one network may use a synchronous transmission in accordance with which an optical packet is transported in a fixed time slot, while the other one may use an asynchronous transmission. The resource access/allocation mechanism (wavelength, time slot) may also be completely different.

3. Further, among the networks there are both the local traffic, the traffic within the same packet optical network, and the cross traffic, and the cross traffic which should not affect the transport of the local traffic, and vice versa.

Figure 1B:
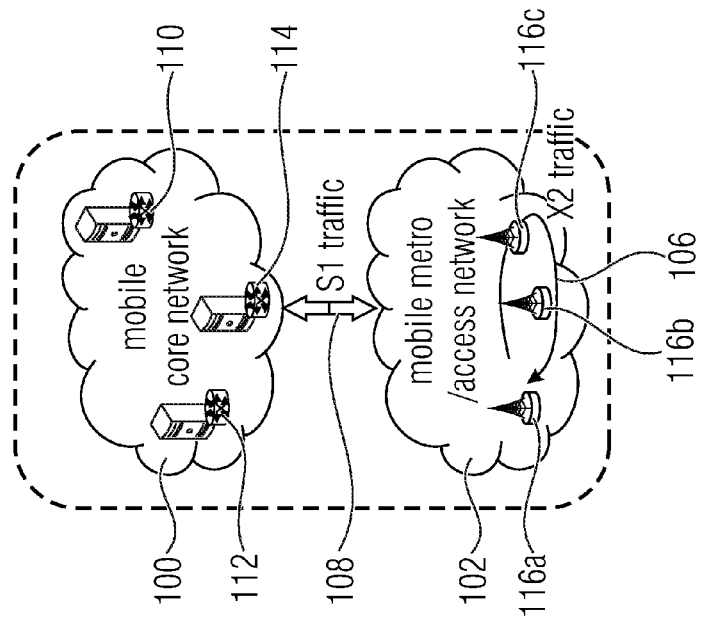
Figure 1A:
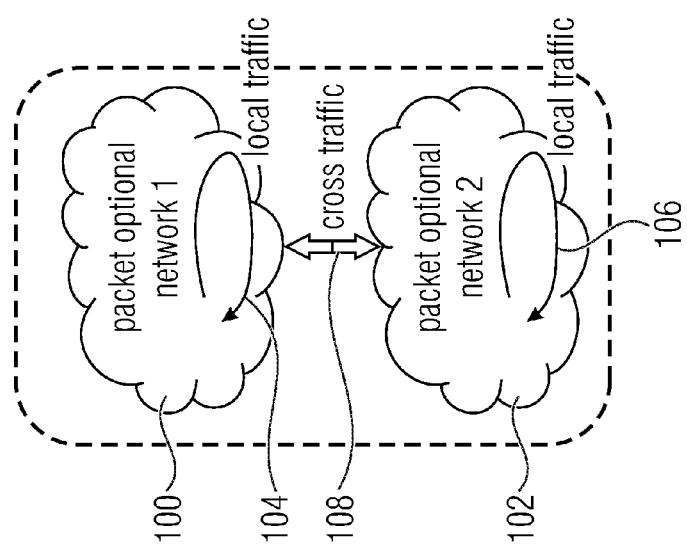
Figure 1C:
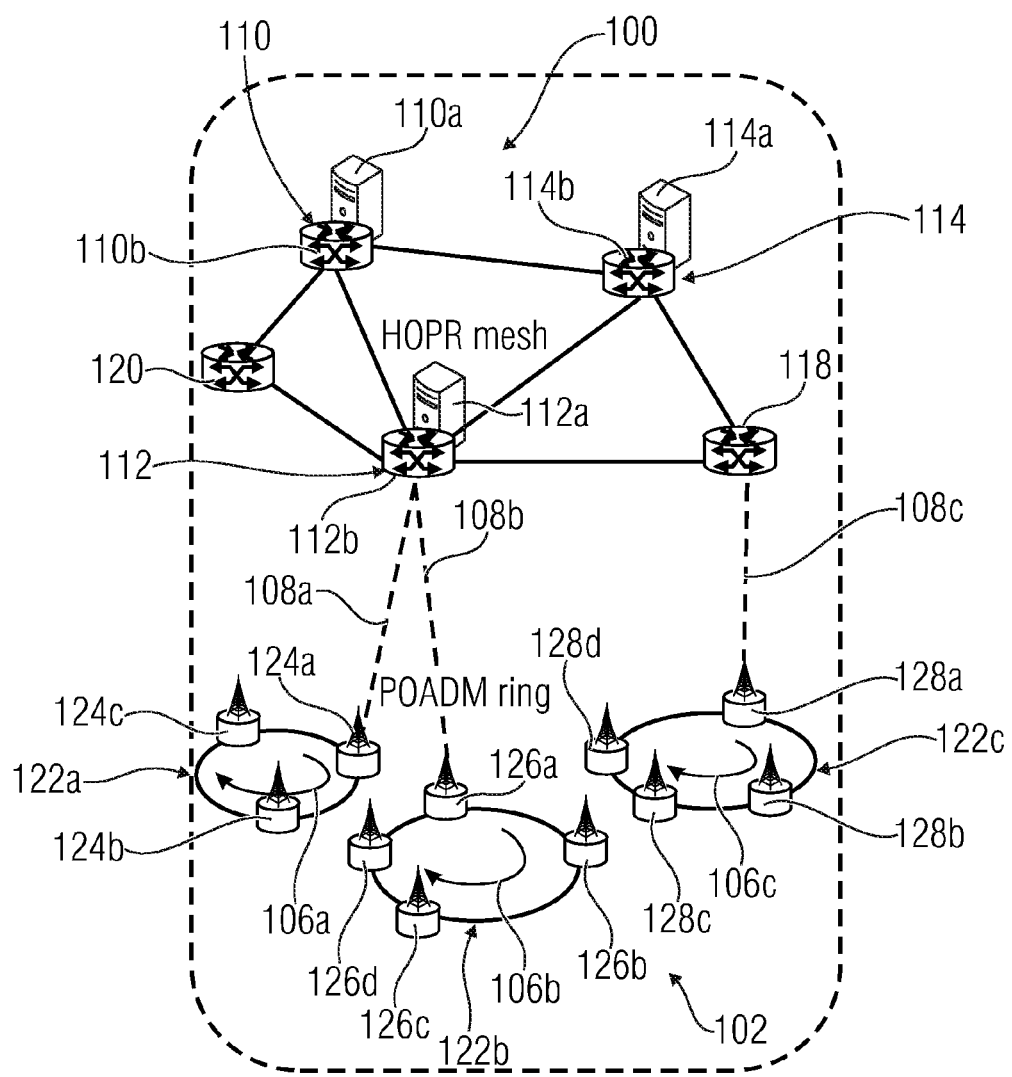
Figure 2:
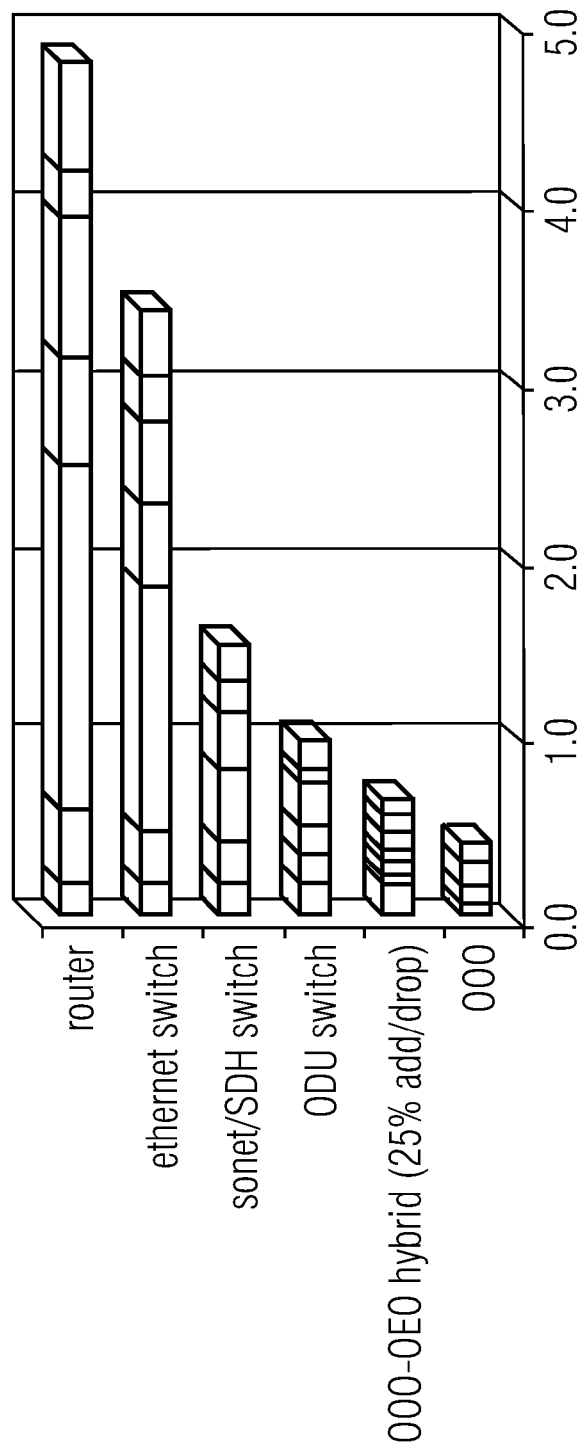
FIG. 2 shows a table comparing the energy consumption at electrical switches/routers and optical switches/routers.
Figure 3:
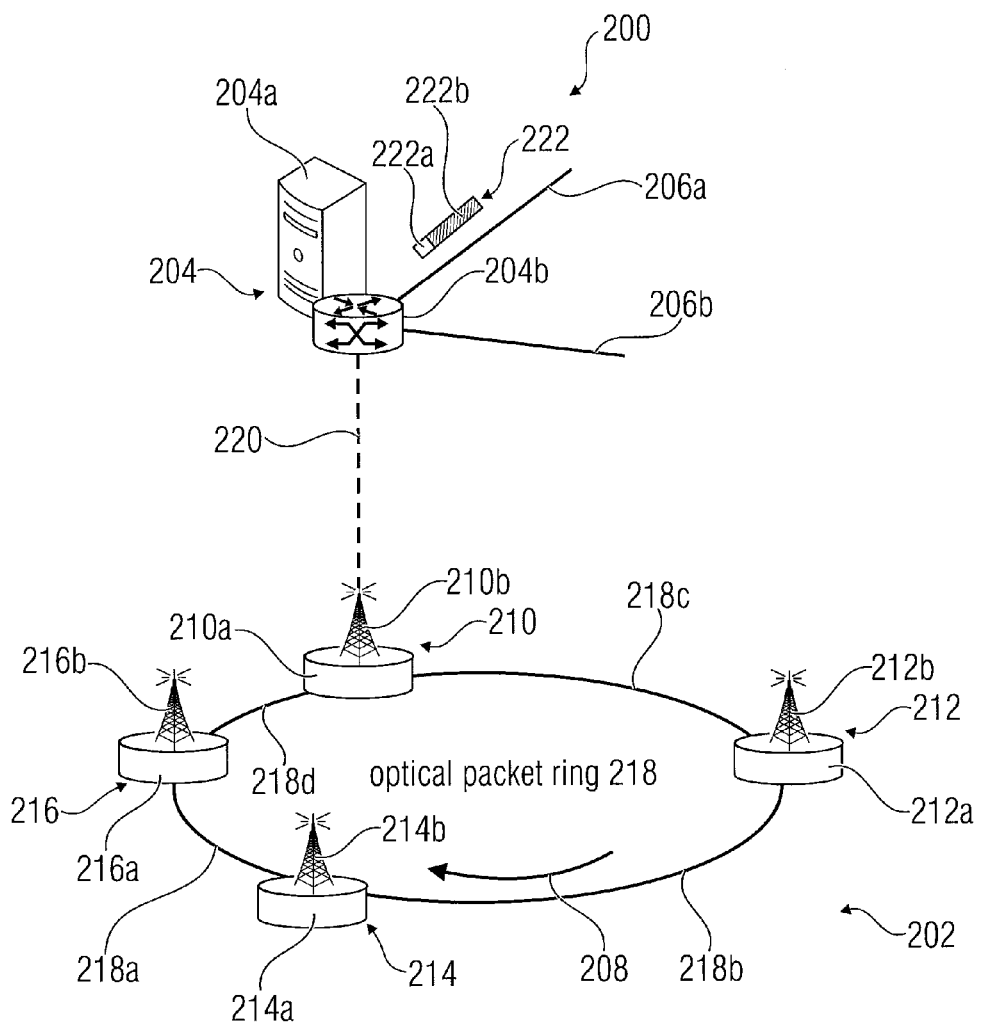
FIG. 3 shows a schematic representation of an optical network that is to receive an external optical data packet from an external node.

FIG. 3 shows a schematic representation of an optical network that is to receive an external optical data packet from an external node. FIG. 3 shows a part of a mobile core network 200 and a schematic representation of a mobile metro/access network 202. The core network 200 may be a network having a structure as described with regard to FIG. 1C and may include an HOPR mesh. A core node 204 is shown, for example a core node implementing a service gateway (S-GW) of the core network. The node 204 includes resources 204a necessitated, for example in the form of CPU cores, memory elements and the like, for implementing the desired functionality, in the present case the service gateway. Further, the node 204 includes an optoelectronic router 204b connected to the resource 204a and further connected to respective optical transmission lines 206a, 206b of the core network 200 for providing a connection to other cores in the optical domain, in a similar way as described with regard to FIG. 1C above. By means of the optical transmission lines 206a, 206b local traffic within the network 200 is communicated among the different nodes thereof.

The mobile network/access network 202 comprises a plurality of nodes 210 to 216, e.g. base stations. In the shown example, the respective nodes are base stations of a mobile access network and each node also includes an optoelectronic router 210a to 216a and respective radio equipment 210b to 216b for communicating with mobile users served by the respective base stations 210 to 216. The base stations 210 to 216 are connected by an optical packet ring 218 as is schematically shown by the optical transmission lines 218a to 218d. For exchanging optical packets in the optical packet ring 218 different wavelengths are allocated to the respective nodes 210 to 216, and the packet to be transmitted inside the network 202 to a destination node is generated in accordance with the wavelength allocated to the destination node so that, via the optical packet ring 218, it can be sent from the source node to the target node.

In FIG. 3 the base station 210 forms the hub node of the network 202, which is the node for connecting the network 202 to the core network 200 as it is schematically represented by the dotted line 220, i.e. cross traffic among the networks 200, 202 that will be transmitted via the connection 220.

While FIG. 3 indicated the node 204 as being part of the core network 200, in other embodiments only the network 202 is provided to which optical packets need to be delivered from an external node. In such a case the node 204 may be an external node not connected to any network. The node 204 may be a service node providing specific services to the users of the mobile network 202 and the data packets necessitated may be generated at the node as optical packets which, in accordance with the invention, should be transmitted by an optical bypass to the network 202 without any conversion into the electrical domain. When considering the environment of FIG. 3 and assuming the node 204 to be part of a core network, the aim of the invention is to realize an optical bypass via the connection 220 between the two packet optical networks 200 and 202. However, this is not an easy task, due to the different control mechanisms, for example with regard to the addressing and the quality of service requirements and the like and in view of the independent data transport planes resulting in different resource allocation/media access schemes, different wavelength allocations and different time slots synchronization.

Without losing generality, the situation in FIG. 3 is now considered, which depicts an example of a mobile packet optical network having a mobile core network 200 including an HOPR mesh, and a mobile metro/access network 202 including a POADM ring 218. The HOPR-technology is one known packet switching technology of the applicant of the present application, which uses the MPLS technology (MPLS: Multi-Protocol Label Switching) for switching an optical packet. The control information is included in the packet header as an MPLS label. The mobile metro/access network uses the POADM technique (Packet Optical Add/Drop Multiplex—see reference [1]) which is a different packet switching technology operating on the basis of a synchronized time slot ring structure for the transport of an optical packet. In this technology, the control information is included in a separated control channel.

As is depicted in FIG. 3, the core network 200 and the metro/access network 202 are interconnected 220 via a core node 204 at the core network side and a hub node 210 at the metro/access network side. The local traffic in the metro/access network 202 may be X2 traffic between the respective base stations, in accordance with the 3GPP definition. The cross traffic 220 may be S1 traffic between the gateways and the base stations of the overall mobile network in accordance with the 3GPP definition. The traffic from the core network 200, called the downstream S1 traffic, should be able to be optically injected into the metro/access network 202 without affecting the local traffic, the X2 traffic.

To provide for a more detailed understanding of this process, the information exchange and processing will now be considered in further detail.

It is assumed that an optical packet 222 to be transmitted from the core network or from the core node to the metro/access network 202 arrives via optical transmission line 206a at the core node 204. The core node 204 may interpret the destination address of the optical packet and send a notification to the hub node 210 of the optical packet ring 218, wherein this notification includes the destination address retrieved from the received optical packet 222. The optical packet may include a header 222a and a payload section 222b, and the destination address may be retrieved by the core node 204 from the information provided in the header 222a of the optical packet 222.

The hub node 210 determines when a time slot with the wavelength necessitated for the desired destination address is available on the basis of the destination address and provides this information to the core node 204, which then performs the wavelength conversion necessitated of the optical packet 222 and passes the datagram optically to the hub node 210. The hub node 210 prepares the control header and injects the control header together with a data payload into the packet optical ring 218.

However, it has been found out that this resource access approach hardly fulfills the above tasks in a timely manner.

More specifically, when considering an opportunistic resource access, this means that the hub node 210 checks the time slots which pass and indicates to the core node 204 to pass the optical packet 222 whenever it finds an empty time slot. In other words, the HOPR core network 200 passes the optical packet 222 to the POADM network 202 whenever a resource, for example a time slot, is available on the POADM network 202. This is depicted in detail in FIG. 4, and it is assumed that at a time $t_0$ the packet 222 arrives at the HOPR network 200. At this time, by means of the core node 204 the message S1 is sent to the hub node 210 of the network 202, the message including the destination address of the packet 222. Shortly after the time $t_0$ the message S1 is received at the hub node 210 of the network 202, and at this time a first time slot, slot 1, passes the hub node 210. Each time slot is assumed to have a length of 100 ns. In the situation depicted in FIG. 4 it is further assumed that the hub node 210 recognizes that the next time slot, slot 2, would be available and the hub node 210 signals to the core node 204 that this slot, slot 2, is available and what wavelength an optical packet in this slot would necessitate for allowing a delivery to the destination node indicated by the destination address of the packet 222. This information is received at the core node 204 where a wavelength conversion and packet switching takes place. However, this necessitates a specific amount of time, 318 ns in the example shown, which is longer than the time duration of the respective time slots in the network 202. At the time the processing at the core node 204 is completed, the available time slot, slot 2, in the network 202 already passed, i.e. the available time slot signaled by the network 202 to the network 200 was missed. To avoid such missing of the available time slot, the node processing time of both networks should map exactly, however, considering the additional signaling between the nodes as well as the signal propagation delay and the signal processing, the time mapping necessitated for avoiding missing valuable time slots is basically impossible. Thus, after the wavelength conversion and packet switching at the network 202, the signaling S3 for transferring the wavelength converted packet to the network 202 will be such that the time slot for the packet is already gone. Thus, the opportunistic resource access approach described with regard to FIG. 4 is not feasible as upon receiving message S3 including the modified packet it is no longer known where the time slot in the network 202 actually is.

Figure 4:
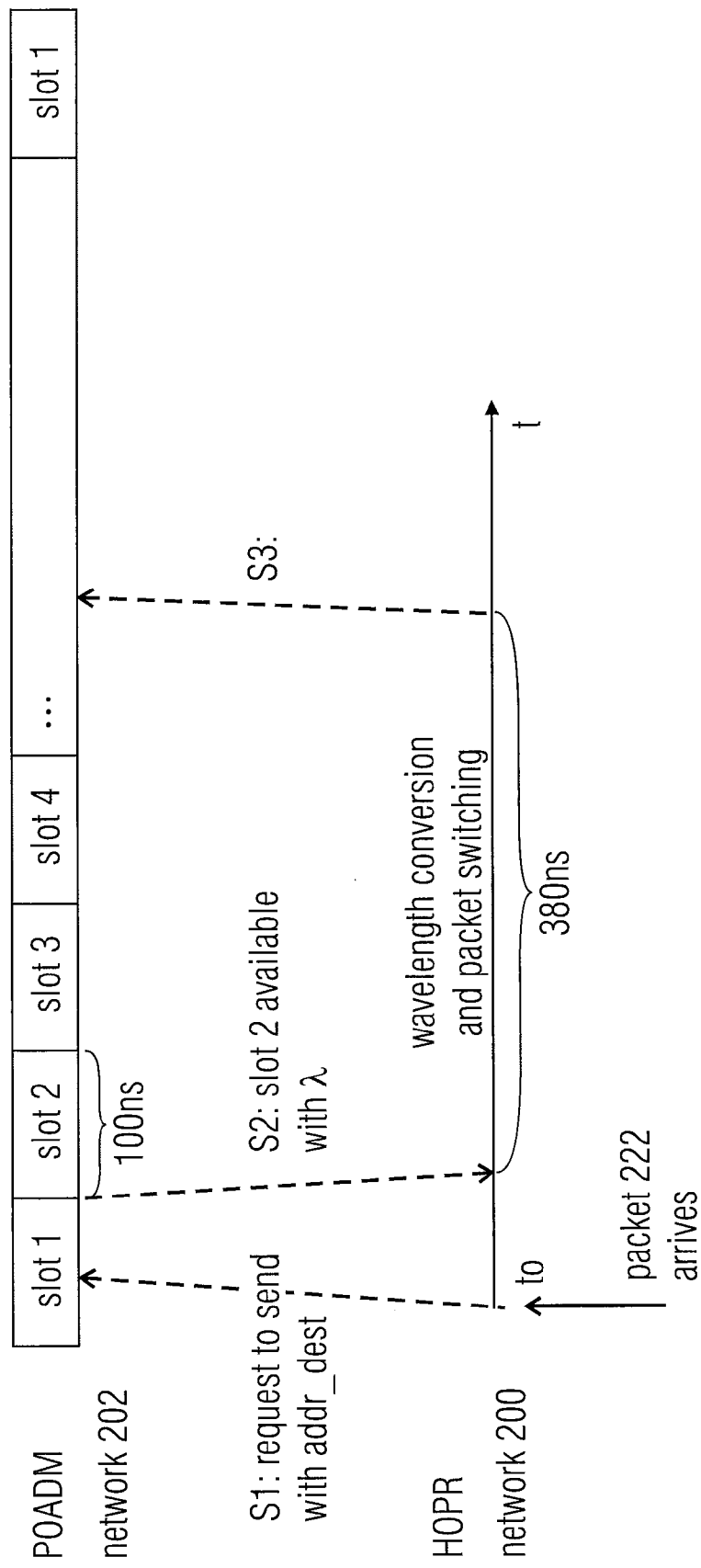
FIG. 4 shows the handling of an optical packet and messages exchanged between the edge nodes of the networks of FIG. 3 when transferring an optical packet without resource reservation.
Figure 5:
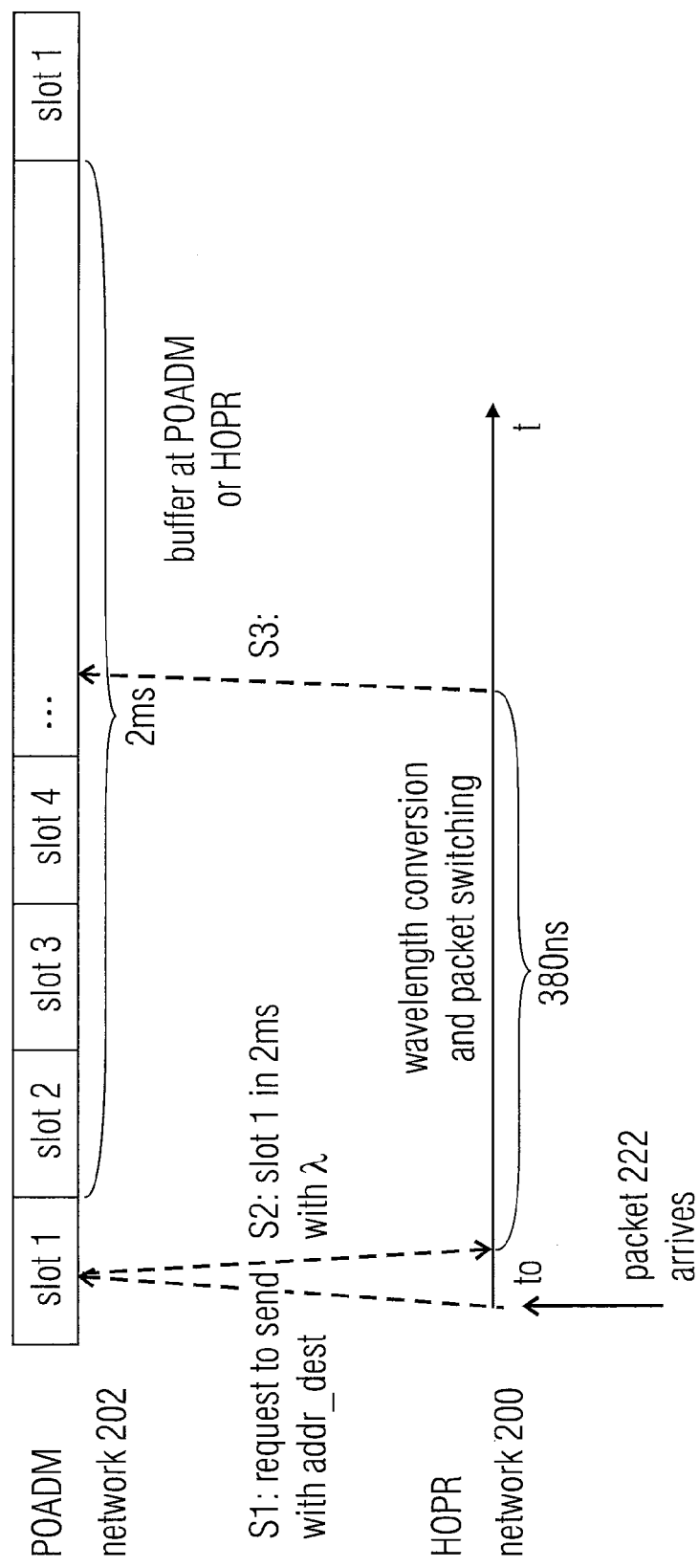
FIG. 5 shows, in a similar way as in FIG. 4, the handling of the optical packet and the messages exchanged when implementing when transferring an optical packet with resource reservation.

To address the just mentioned problem described with regard to FIG. 4, one possibility would be to make some reservation of the resource in the network 202 upon receiving the request for handling cross traffic, as is for example described in reference [1]. FIG. 5 shows, in a similar way as in FIG. 4, the handling of the packet and the messages exchanged when implementing SWING (Simple Wdm rING—see reference [3]), a distributed reservation protocol. In this scenario, the POADM network 202 will make a reservation for the time slot and the wavelength after receiving the request from the core node 204. In FIG. 5 it is assumed that at time $t_0$ the packet 222 arrives at the core node 200 which sends out the message S1 including the notification of the destination address which is received at the hub node 210 of the network 202. The hub node will reserve the current time slot, "slot 1", for transmitting the packet. Then the hub node 210 signals, via the message S2, that the time slot "slot 1" is reserved and will occur again in 2 ms. The message S2 further includes an information of the wavelength needed to reach the destination node in the network 202. After receiving at the core node 204 the message S2, the wavelength conversion and packet switching necessitated is carried out, which again takes some time, for example 380 ns, and then the converted packet needs to be transmitted to the network 202 by means of message S3. However, at the time the wavelength conversion and packet switching is completed and at the time at which the message S3 reached the network 202 only a small fraction of the 2 ms period until the next receipt of time slot "slot 1", which has been reserved for the packet, has lapsed which, as a consequence, results in a waiting time in the order of milliseconds until the reserved slot passes the hub node once again and only then can the converted packet be injected into the network 202. As a consequence, this necessitates buffering the converted packet either at the POADM network 202 or at the HOPR network 200. However, optical delay lines cannot cope with waiting times in the range of milliseconds, rather they can only cope with waiting times of one or more hundreds of nanoseconds, so that in the scenario of FIG. 5 an electric buffer is needed for buffering the converted packet so that again an OEO-conversion would be necessitated, which is undesired.

In other words, in the scenario depicted in FIG. 5, the optical packet which has been converted needs to either wait in the target optical network, that is the hub node which is the edge node of the POADM network 202 shown in the example of FIG. 5, or at the source optical network, i.e. the core node 204 which is the edge node of the HOPR network in the example shown in FIG. 5, until the reserved time slot arrives. As mentioned above, this waiting time is in the scale of milliseconds and since optical buffering is very expensive and currently only possible by an optical delay line which can cope with delays in the scale of several hundred nanoseconds, the optical packet needs to be converted into the electrical domain, stored in an electrical buffer and converted back into the optical domain when the reserved time slot arrives. Naturally, this increases the energy consumption and will cause additional delay which is undesired.

Therefore, in accordance with embodiments of the invention a concept of dedicated data channels for the cross traffic and for the local traffic, respectively, for interconnecting different packet optical networks is introduced and the corresponding new procedure of information exchange and datagram exchange will be described in further detail below.

Figure 6:
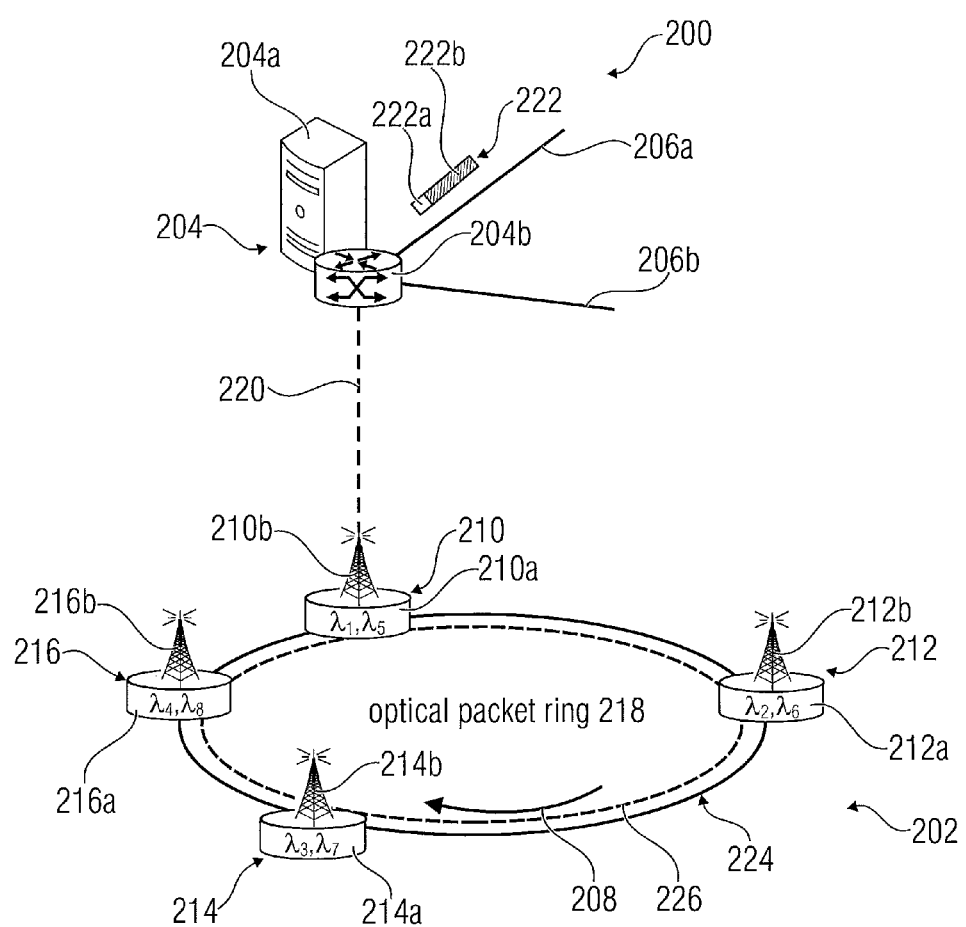
FIG. 6 shows a schematic representation of a system for providing an external optical data package to a destination node in accordance with an embodiment of the invention.

FIG. 6 shows a schematic representation of a system for providing an external optical data package to a destination node in accordance with an embodiment of the invention. FIG. 6 shows a similar scenario as in FIG. 3. In FIG. 6, the optical packet ring 218 is schematically shown, however, in accordance with the inventive approach the optical packet ring 218 now includes a first data channel 224 connecting the respective nodes 210 to 216 and being used only for the local traffic exchanged within the network 202 among the nodes 210 to 216. In addition, the optical packet ring 218 includes a further data channel 226 dedicated to transporting optical packets from the cross traffic 220 among the respective nodes 210 to 216. Thus, in accordance with the inventive approach, in the network 202 two independent data channels 224, 226 are provided, wherein the first data channel 224 is used for the local traffic, and the second data channel 226 is used for the cross traffic 220. One example for such independent data channels is the use of data channels having different wavelengths associated therewith, and thanks to the WDM technology, traffic carried by different wavelengths can be transported in the same fiber without interfering with each other. Thus, the optical packet ring 218 may be implemented by a single fiber, and the respective data channels 224 and 226 are defined by the respective sets of different wavelengths. In the example of FIG. 6, it is assumed that the local traffic data channel is formed by the wavelengths $\lambda_1$ to $\lambda_4$ allocated to the nodes 210 to 216, as is indicated in the figure. Thus, dependent on the destination, local traffic packets are provided at the wavelength allocated to the destination node in the network 202. Further, each node has allocated further wavelengths $\lambda_5$ to $\lambda_8$ and these wavelengths define the cross traffic data channel 226 so that a data packet 222 to be transmitted from the core network 200, for example to node 214 of the metro/access network 202, is wavelength converted so that it has the wavelength $\lambda_7$ so that it can be transmitted via the ring 218, the single fiber for example, to the node 214. Each of the nodes 210 to 216 of the POADM ring 218 includes two receivers, one to receive the wavelength allocated for the local traffic, and another one to receive the wavelength allocated for the local traffic. Also respective transmitters may be provided for allowing packets to be sent out either to other local base stations or to the core network.

It is noted that the core network 200 may also have such a configuration, i.e. in a similar way as the network 202 it may include two data channels, one for the local traffic and one for the cross traffic which needs to be transmitted via the core node 204 to other nodes in the core network and which originates from the network 202. In a similar way as described with regard to the metro/access network, in the core network the transmission of the two data channels may also be via a single fiber as the signals are separated by their different wavelengths.

As to the actual resources for the two independent data channels 224 and 226, it is noted that in accordance with embodiments, the wavelengths for these data channels can be allocated either dynamically or in advance based on statistics.

The control information, for example a wavelength to destination address mapping table, may be exchanged in advance and independent from the occurrence of cross traffic. In this way, the source packet optical network (in the embodiment of FIG. 6 the core network 200) is able to perform wavelength conversion without any interaction with the target packet optical network (the metro/access network 202 in the embodiment of FIG. 6). The target packet optical network 200 can prepare the control header in parallel to the source packet optical network processing after getting a short notice of the arriving packet from the source packet optical network including the address information and possible QoS information. The time synchronization may be done periodically independent from whether cross data traffic occurs or not.

Figure 7:
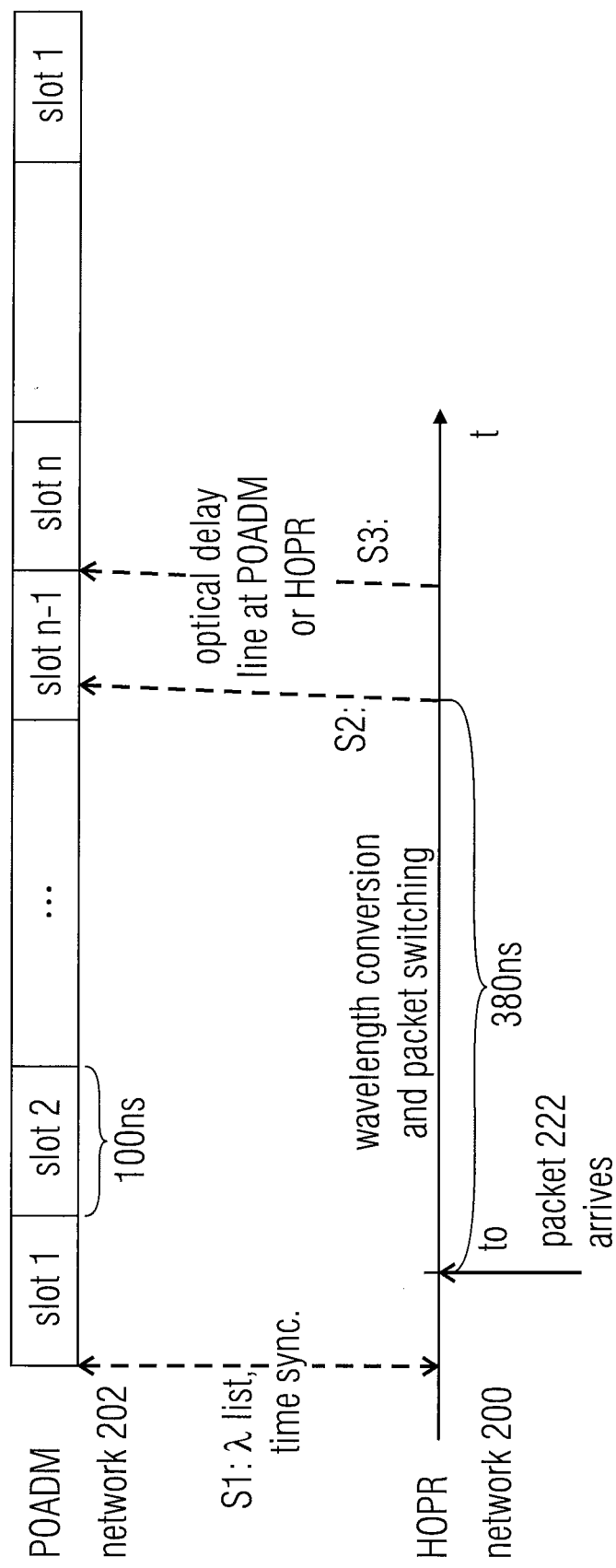
FIG. 7 shows, in a similar way as FIGS. 4 and 5, the activities occurring at the respective networks and between the networks when implementing the inventive approach of providing separated data channels for local traffic and cross traffic.

FIG. 7, in a similar way as in FIGS. 4 and 5, shows the activities occurring at the respective networks and between the networks when implementing the inventive approach of providing separated data channels for local traffic and cross traffic, thereby guaranteeing the availability of resources for the cross traffic. Basically, at each time slot in the POADM network 202, due to the different channels that can be transmitted at the same time, a cross traffic optical packet received from the network 200 can be transmitted. In accordance with embodiments of the invention, at some instance of time a message S1 is exchanged between the networks 200 and 202, more specifically between the core node 204 of the core network 200 and the hub node 210 of the metro/access network 202. The message S1 includes a list of wavelengths associated with the second data channel and allocated to the respective nodes of the network 202. A time synchronization between the networks may also be carried out which may be repeated at predetermined intervals later. It is assumed that at a time $t_0$ the packet 222 arrives and without any further signaling between the networks, at the core node 204 on the basis of the information from the λ-list obtained via message S1 at an earlier time wavelength conversion and packet switching occurs. After this processing is completed, for example after the 380 ns which are needed therefore, the converted packet is transmitted via message S2 or via message S3 to the network 202. When using message S2, the converted packet is transmitted after conversion is completed and an optical delay line at the network 202 may be provided for delaying the received signal until the start of the next time slot, in the example slot n. Alternatively, due to the synchronization, the network 200 has knowledge about the times when the respective time slots in the network 202 occur at the hub node 210 and therefore the optical delay line may also be at the core node 204 or at the core network 200 delaying the sending of the message S3 in such a way that upon sending the message via message S3 it is received at the beginning of the desired time slot, "slot n".

Thus, in accordance with the inventive approach no electric buffer is needed and as a consequence no OEO conversion.

Figure 8:
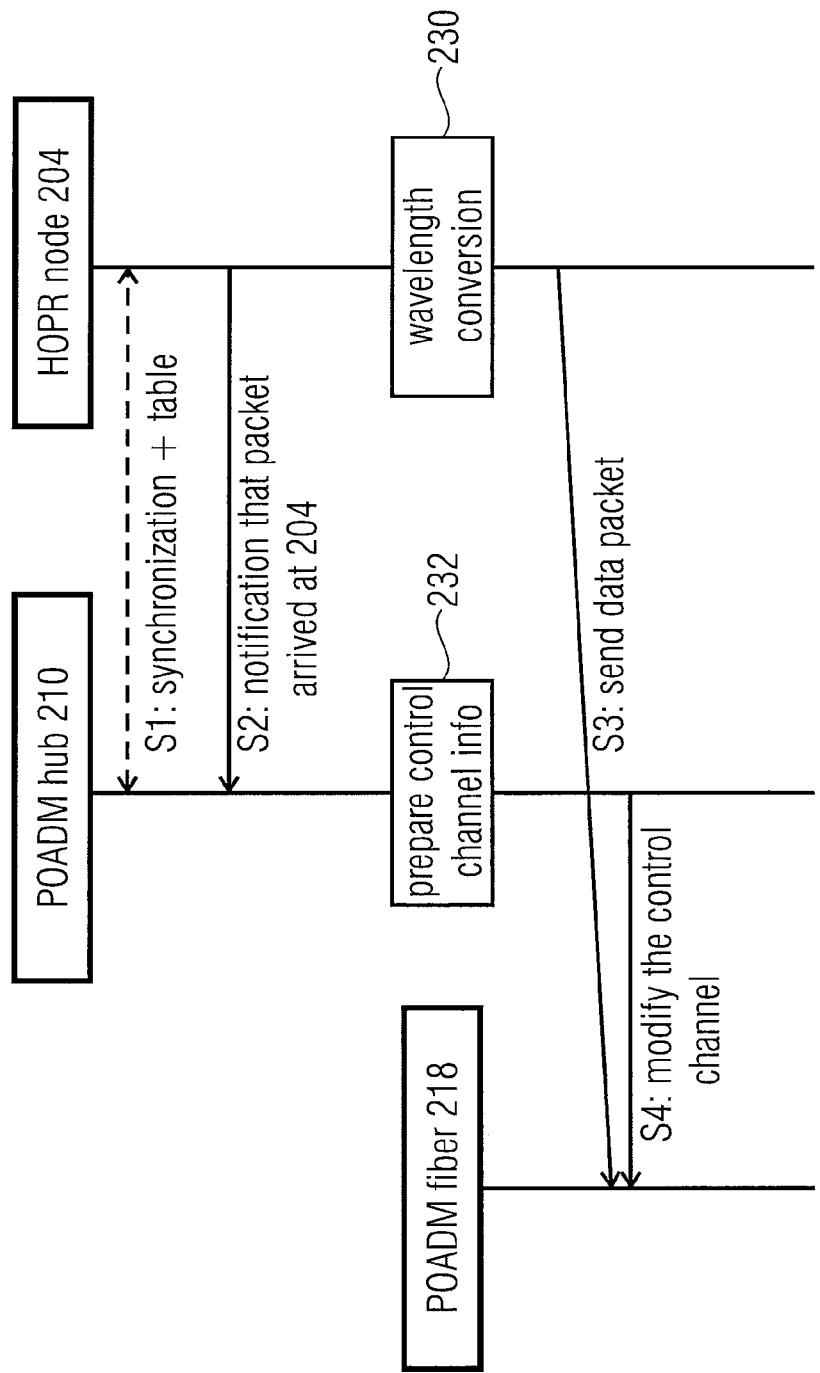
FIG. 8 shows a signaling diagram among the respective elements of the scenario depicted in FIG. 6.

FIG. 8 shows a signaling diagram among the respective elements of the scenario depicted in FIG. 6. In FIG. 8 the signaling between the HOPR node 204, the POADM hub 210 and the POADM fiber 218 is indicated. At a specified time, for example at a time of setting up the two networks 200 and 202 or at another time a message S1 is exchanged for synchronizing the time basis of the two networks, and a table mapping a destination address in the network 202 to a specific wavelength of the core traffic data channel is also sent to the core node 204. Upon receiving at the core node 204 a packet to be transferred to the network 202, a short notice S2 is sent to the hub 210 and at 230 the node 204 performs the conversion necessitated of the packet received, for example the wavelength conversion, on the basis of the pre-known wavelength allocation. Following this operation 230, the message S3 is sent out and may be delayed at the node 204 or at the hub 210 for being in alignment with the next time slot available. In parallel, at 232 the hub 210 prepares the control channel information necessitated and transmits same via message S4 to the fiber 218 so that the information from the hub 210 and the information from the node 204 arrive at the fiber 210 at the same time, more specifically at the same time slot. Thus, when compared to the approaches above, the signal exchange between the different packet optical networks is reduced and the procedure at the connection nodes or edge nodes of the packet optical networks are decoupled, for example the operations 230 and 232 for carrying out the wavelength conversion at the node 204 and for preparing the channel control info at node 232 can be done in parallel. As a result, the waiting time of the optical packet at the target/source packet optical network is decreased to less than 100 ns, more generally to less than the duration of a time slot in the fiber 218, as can be seen from FIG. 7, and such waiting time can be easily realized using an optical delay line thereby avoiding unnecessary and undesired electrical buffer and associated optical electrical conversion.

With regard to the inventive approach described above, it is to be noted that embodiments are not about simply changing a wavelength of a data channel used for transmitting data in an optical communication network, rather, as described above, the inventive approach is directed to one or more packet optical networks and for providing an optical data packet to the network either from an external node or from an external network. Packet optical networks are similar to non-optical packet switched networks in that the packet sent over the network includes a header and a payload wherein the header has the information necessitated for routing the packet to the destination. Thus, when switching optical data packets to a new optical network it is necessitated to both provide for a wavelength conversion of the data payload in view of the prerequisites of the receiving optical network and, in addition, it is necessitated to convert the control information from the header of the packet in such a way that the control information, especially the address of the destination, is also available and usable in the destination network.

Therefore, as has for example been described with regard to FIG. 8, optically converting the external optical data packet 222 comprises the two steps of a wavelength conversion 230 of the data payload, and preparing 232 a control header or control information based on the control information in the external optical data packet 222. Following this, optically transferring the converted external optical data packet to the packet optical network 202 comprises sending (see messages S3 and S4) the wavelength converted data payload and the prepared control header or control information to the packet optical network 202.

As mentioned, the above steps are carried for optically transferring an optical data packet to a receiving network, and in accordance with the inventive approach for avoiding the necessity for carrying out an intermediate conversion into the electrical domain, the additional control channel in the destination network is provided so that after completing the conversion of the data and the generation of the control information it can be transferred to the designated control channel in the receiving network for being routed to the destination using the control information generated for the receiving network.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a non-transitory data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] Dominique Chiaroni, Géma Buforn Santamaria, Christian Simonneau, Sophie Etienne, Jean-Christophe Antona, Sébastien Bigo, Jesse Simsarian: Packet OADMs for the next generation of ring networks. Bell Labs Technical Journal 14(4): 265-283 (2010)
[2] Thomas Bonald, Raluca-Maria Indre, Sara Oueslati, Chloé Rolland: Throughput-Delay Trade-Offs in Slotted WDM Ring Networks. BROADNETS 2010: 314-327
[3] T. Bonald, S. Oueslati, J. Roberts, C. Roger, SWING: Traffic capacity of a simple WDM ring network, Proc. of ITC 21, 2009

What is claimed is:

1. A method for providing an external optical data packet to a destination node of a packet optical network, the packet optical network comprising a plurality of nodes and a first optical data channel for optically communicating local optical data packets between the plurality of nodes, the method comprising:
optically converting the external optical data packet for a transmission to the destination node over a second optical data channel of the packet optical network, the first and second optical data channels being independent of each other;
optically transferring the converted external optical data packet to the packet optical network; and
transmitting the converted external optical data packet to the destination node over the second optical data channel,
wherein the external optical data packet comprises a header and a payload section, and wherein the header comprises control information and the payload section comprises data payload,
wherein the method comprises upon receipt of the external optical data packet sending a notification to the packet optical network, the notification comprising address information about the destination node,
wherein the packet optical network further comprises a control channel for communicating control channel information between the plurality of nodes, and
wherein the method comprises:
preparing the control header for the external optical data packet on the basis of the received notification, and transmitting the control header over the control channel upon transmitting the converted external optical data packet over the second data channel.

2. The method of claim 1, wherein optically converting the external optical data packet comprises a wavelength conversion of the data payload, and preparing a control header or control information based on the control information in the external optical data packet; and wherein optically transferring the converted external optical data packet to the packet optical network comprises sending the wavelength converted data payload and the prepared control header or control information to the packet optical network.

3. The method of claim 1, wherein the first and second optical data channels comprise allocated different wavelengths, and optically converting the external optical data packet comprises a wavelength conversion for acquiring the converted external optical data packet at a wavelength allocated to the destination node for transmission over the second optical data channel.

4. The method of claim 3, wherein the wavelength conversion is based on a table mapping destination addresses for the nodes of the packet optical network to wavelengths allocated to the nodes of the packet optical network for transmission over the second optical data channel.

5. The method of claim 3, wherein the wavelength used for transmission over the first and second optical data channels are allocated dynamically or in advance.

6. The method of claim 1, wherein the packet optical network comprises an optical fiber, and wherein the optical data packets for the first and second data channels are transmitted in the same optical fiber.

7. A non-transitory computer program product comprising instructions stored on a computer readable medium, the instructions when being executed on a computer performing a method of claim 1.

8. A method for providing an external optical data packet to a destination node of a packet optical network, the packet optical network comprising a plurality of nodes and a first optical data channel for optically communicating local optical data packets between the plurality of nodes, the method comprising:

optically converting the external optical data packet for a transmission to the destination node over a second optical data channel of the packet optical network, the first and second optical data channels being independent of each other;

optically transferring the converted external optical data packet to the packet optical network; and transmitting the converted external optical data packet to the destination node over the second optical data channel, wherein the external optical data packet comprises a header and a payload section, and wherein the header comprises control information and the payload section comprises data payload, wherein the method comprises upon receipt of the external optical data packet sending a notification to the packet optical network, the notification comprising address information about the destination node, and wherein the notification comprises further information about the external optical data packet, like the QoS of the packet, the control header being further prepared on the basis of the further information.

9. A non-transitory computer program product comprising instructions stored on a computer readable medium, the instructions when being executed on a computer performing a method of claim 8.

10. A method for providing an external optical data packet to a destination node of a packet optical network, the packet optical network comprising a plurality of nodes and a first optical data channel for optically communicating local optical data packets between the plurality of nodes, the method comprising:

optically converting the external optical data packet for a transmission to the destination node over a second optical data channel of the packet optical network, the first and second optical data channels being independent of each other;

optically transferring the converted external optical data packet to the packet optical network; and transmitting the converted external optical data packet to the destination node over the second optical data channel, wherein the external optical data packet comprises a header and a payload section, and wherein the header comprises control information and the payload section comprises data payload, wherein the packet optical network is a slotted packet optical network, wherein the method comprises optically delaying the converted external optical data packet so that the converted external optical data packet is transmitted in the next time slot, the delay being less than or equal to the duration of a single time slot in the slotted packet optical network.

11. A non-transitory computer program product comprising instructions stored on a computer readable medium, the instructions when being executed on a computer performing a method of claim 10.

12. A method for providing an external optical data packet to a destination node of a packet optical network, the packet optical network comprising a plurality of nodes and a first optical data channel for optically communicating local optical data packets between the plurality of nodes, the method comprising:

optically converting the external optical data packet for a transmission to the destination node over a second optical data channel of the packet optical network, the first and second optical data channels being independent of each other;

optically transferring the converted external optical data packet to the packet optical network; and transmitting the converted external optical data packet to the destination node over the second optical data channel, wherein the external optical data packet comprises a header and a payload section, and wherein the header comprises control information and the payload section comprises data payload, wherein the external optical data packet is received at an external node optically coupled to the packet optical network, wherein the external data packet is optically converted at the external node, wherein the external node is a node of a further packet optical network comprising a plurality of nodes communicating over a further optical data channel, and wherein the packet optical network comprises a mobile access network operating in accordance with a first technology and the further packet optical network comprises a mobile core network operating in accordance with a second technology being different from the first technology, and wherein the local optical data packets comprise packets transmitted between base stations of the mobile access network and the external optical data packets comprise packets transmitted between gateways of the mobile core network and the base stations of the mobile access network.

13. A non-transitory computer program product comprising instructions stored on a computer readable medium, the instructions when being executed on a computer performing a method of claim 12.

14. A system for providing an external optical data package to a destination node, the system comprising:
   a packet optical network comprising a plurality of nodes, a first optical data channel for optically communicating local optical data packets between the plurality of nodes, and a second optical data channel for optically communicating external optical data packets between the plurality of nodes, wherein the first and second data channels are independent of each other, and wherein the plurality of nodes comprise the destination node; and
   an external node optically connected to the packet optical network, the external node being configured to receive the external optical data packet, to optically convert the received external optical data packet for a transmission to the destination node over the second optical data channel of the packet optical network, and to optically transfer the converted external optical data packet to the packet optical network,
   wherein the external optical data packet includes a header and a payload section, and wherein the header includes control information and the payload section includes data payload,
   wherein upon receipt of the external optical data packet a notification is received at the packet optical network, the notification comprising address information about the destination node,
   wherein the packet optical network comprises a control channel for communicating control channel information between the plurality of nodes, the control header for the external optical data packet being prepared on the basis of the received notification, and the control header being transmitted over the control channel upon transmitting the converted external optical data packet over the second data channel.

15. A system for providing an external optical data package to a destination node, the system comprising:
   a packet optical network comprising a plurality of nodes, a first optical data channel for optically communicating local optical data packets between the plurality of nodes, and a second optical data channel for optically communicating external optical data packets between the plurality of nodes, wherein the first and second data channels are independent of each other, and wherein the plurality of nodes comprise the destination node; and
   an external node optically connected to the packet optical network, the external node being configured to receive the external optical data packet, to optically convert the received external optical data packet for a transmission to the destination node over the second optical data channel of the packet optical network, and to optically transfer the converted external optical data packet to the packet optical network,
   wherein the external optical data packet includes a header and a payload section, and wherein the header includes control information and the payload section includes data payload,
   wherein upon receipt of the external optical data packet a notification is received at the packet optical network, the notification comprising address information about the destination node, and
   wherein the notification comprises further information about the external optical data packet, like the QoS of the packet, the control header being further prepared on the basis of the further information.

16. A system for providing an external optical data package to a destination node, the system comprising:
   a packet optical network comprising a plurality of nodes, a first optical data channel for optically communicating local optical data packets between the plurality of nodes, and a second optical data channel for optically communicating external optical data packets between the plurality of nodes, wherein the first and second data channels are independent of each other, and wherein the plurality of nodes comprise the destination node; and
   an external node optically connected to the packet optical network, the external node being configured to receive the external optical data packet, to optically convert the received external optical data packet for a transmission to the destination node over the second optical data channel of the packet optical network, and to optically transfer the converted external optical data packet to the packet optical network,
   wherein the external optical data packet includes a header and a payload section, and wherein the header includes control information and the payload section includes data payload,
   wherein the packet optical network is a slotted packet optical network, and
   wherein the converted external optical data packet is optically delayed so that the converted external optical data packet is transmitted in the next time slot, the delay being less than or equal to the duration of a single time slot in the slotted packet optical network.

17. A system for providing an external optical data package to a destination node, the system comprising:
   a packet optical network comprising a plurality of nodes, a first optical data channel for optically communicating local optical data packets between the plurality of nodes, and a second optical data channel for optically communicating external optical data packets between the plurality of nodes, wherein the first and second data channels are independent of each other, and wherein the plurality of nodes comprise the destination node; and
   an external node optically connected to the packet optical network, the external node being configured to receive the external optical data packet, to optically convert the received external optical data packet for a transmission to the destination node over the second optical data channel of the packet optical network, and to optically transfer the converted external optical data packet to the packet optical network,
   wherein the external optical data packet includes a header and a payload section, and wherein the header includes control information and the payload section includes data payload,
   wherein the external optical data packet is received at an external node optically coupled to the packet optical network, wherein the external data packet is optically converted at the external node, wherein the external node is a node of a further packet optical network comprising a plurality of nodes communicating over a further optical data channel, and wherein the packet optical network comprises a mobile access network operating in accordance with a first technology and the further packet optical network comprises a mobile core network operating in accordance with a second technology being different from the first technology, and wherein the local optical data packets comprise packets transmitted between base stations of the mobile access network and the external optical data packets comprise packets transmitted between gateways of the mobile core network and the base stations of the mobile access network.

* * * * *